United States Patent Office 3,529,630
Patented Sept. 22, 1970

3,529,630
COMBINED STOP AND CONTROL VALVE
Leaman B. Podolsky, Wilmington, Del., assignor to Westinghouse Electric Corporation, Pittsburgh, Pa., a corporation of Pennsylvania
Filed Apr. 11, 1968, Ser. No. 720,664
Int. Cl. F16k 11/20
U.S. Cl. 137—630.13                6 Claims

ABSTRACT OF THE DISCLOSURE

The invention comprises a valve structure for controlling the flow of pressurized fluid in which the movable stop and control valve members are concentrically disposed and cooperate with a common valve seat to block fluid flow. The two valve members are independently movable along the center axis of a valve housing by concentrically disposed shaft members extending through the same end wall of the housing.

BACKGROUND OF THE INVENTION

It has been the practice on large, fossile fired turbines to provide separate stop and interceptor valves for fluid flow control between a reheater unit and the inlet port of a turbine. A similar arrangement of valves may be employed with nuclear plant turbines as an inlet stop or throttle valve and a control valve. Interceptor and stop valves are ones in which the flow of the fluid therethrough is completely stopped in one (closed) position or completely free to flow through the valve in a second (open) position with no intermediate positions contemplated. A control valve, in contrast thereto, operates through an infinite number of positions between fully open and fully closed positions to thus provide a continuous fluid flow regulating function in response to a continuously controlling function.

Valves for controlling motive steam flow in large turbine apparatus are generally very large in order to handle the large volumetric flows encountered in such turbines with minimum pressure losses. Interceptor valves, in particular, have become so large that when disposed in conduits directing partially expanded steam from high pressure turbines to lower pressure turbines, the turbine casing sizes are often dictated primarily by the size of the interceptor valves, and not the steam flow conditions within the turbines.

Further, because of the large size of valves employed in steam turbine apparatus, extensive space is required for accommodating each valve, and extensive and expensive support structure is required to properly support each valve.

Thus, because of these size, space and support requirements, as well as the cost of such valves and their support structures, separate valve functions have been combined in a single valve housing unit such as shown in U.S. Pat. 3,312,241 issued to O. N. Bryant and assigned to the present assignee, and single function valve structures have been redesigned to provide a more efficient flow of fluid therethrough thereby substantially reducing the size of the valve, for example, as disclosed in U.S. Pat. 3,286,979 issued to R. D. Brown et al. and assigned to the present assignee.

There remains however, in the valve art, a need for a combined stop and control valve structure and function, particularly in nuclear plant turbine apparatus where the use of single function valves may cost as high as 250,000 dollars, and where considerable installation space and supporting structure are required to accommodate and support separate valve structures.

BRIEF SUMMARY OF THE INVENTION

The present invention provides a combined stop and control valve structure that requires essentially the material, space and cost of only one valve thereby providing substantial savings in installation space and dollar costs while simultaneously providing two valve functions, namely, those of a control valve and a stop valve. This is accomplished by disposing stop and control valve members concentrically in a valve housing, the control valve member being concentrically disposed within the stop valve member. The valve members cooperate with a common fixed valve seat forming an outlet port in the valve housing.

Both of the valve members are respectively attached to concentrically disposed shafts actuated from one end of the valve housing, one of the shafts being hollow to accommodate the other shaft. The shafts are positioned to move the stop and control valve members along the center axis of the valve housing. A pilot valve member may be disposed within the control valve member for balancing fluid pressure thereacross, the pilot valve being actuated by the shaft employed to move the control valve member.

In this manner, combined stop and interceptor or control valve functions are effectively and economically performed within a single housing unit with the actuating shafts compactly positioned to operate the valve members from the same end of the unit, thereby providing further savings in cost and space. In addition, economies are provided with regard to mounting structures and arrangements for the combined valve because of its considerably lesser weight and physical size.

THE DRAWINGS

The invention, along with the objects and advantages thereof, will become more apparent from the following detailed description read in connection with the accompanying drawings in which.

PREFERRED EMBODIMENT

Figure 1:
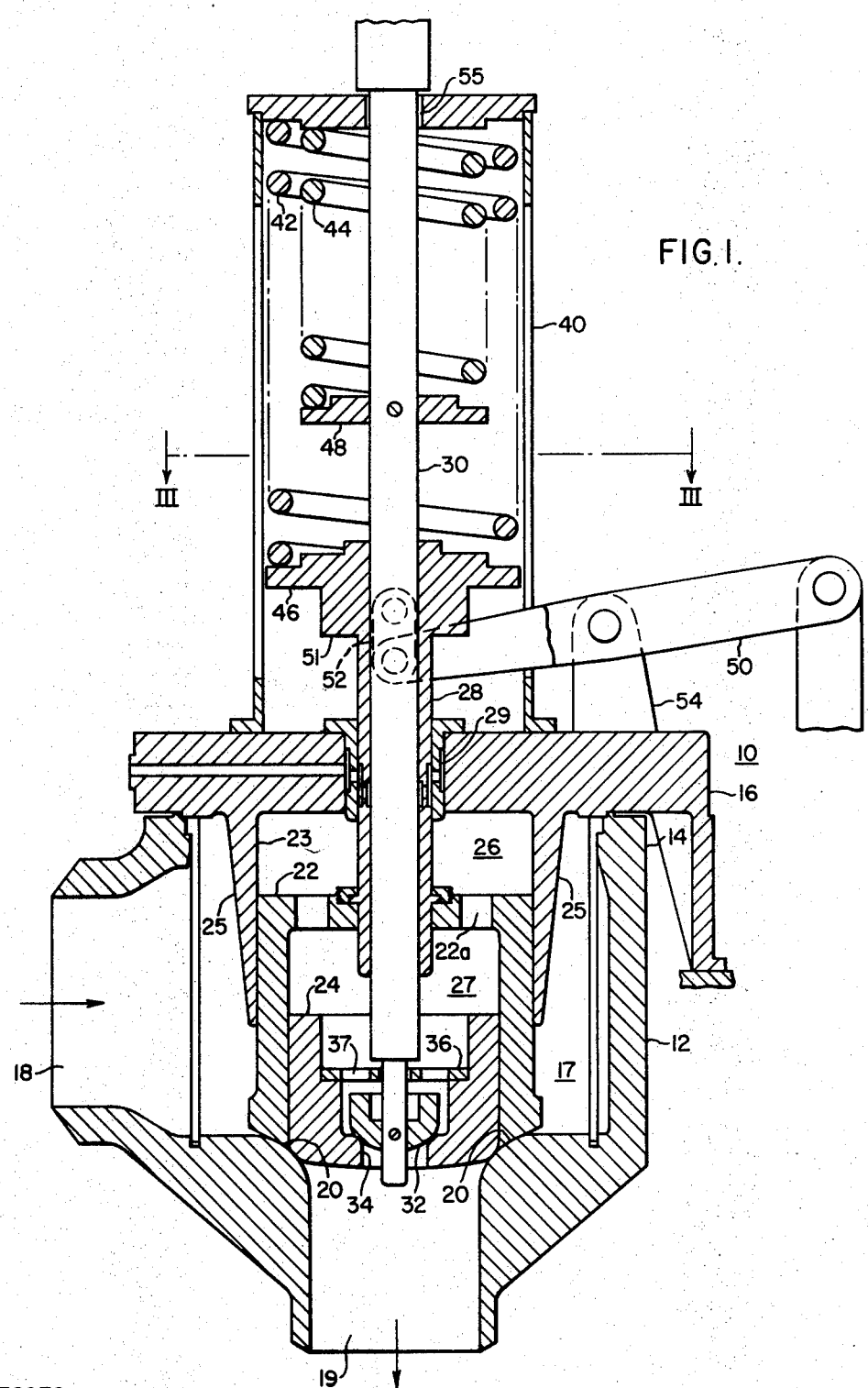
FIG. 1 is a vertical sectional view of a combined stop and control valve structure constructed in accordance with the principles of the invention, the valve structure being shown in a fully closed position.

Referring to the drawings in detail, FIG. 1 shows a combined valve structure generally designated 10 and constructed in accordance with the invention. The valve structure includes a tubular or cup-shaped body member 12 having an annular open end or seal portion 14 cooperatively associated with an upper closure or end wall member 16 to form a main valve chamber 17. The body member 12 is provided with inlet and outlet ports 18 and 19 respectively, communicating with the valve chamber. As illustrated, the inlet and outlet ports are disposed substantially at right angles to each other, though the invention is not limited thereto.

The outlet port 19 is provided with a smoothly rounded valve seat 20 of annular shape formed in axial alignment with concentrically positioned, first and second movable valve members 22 and 24 disposed in the valve chamber 17. In a manner to be more fully explained hereinafter, the movable valve member 22 functions as a stop valve, and the movable valve member 24 functions as a control valve.

The second movable or control valve member 24 is generally a cup-shaped structure and is disposed within the first movable or stop valve member 22 for slidable engagement therewith. The first valve member 22 is similarly an inverted cup-shaped structure slidably received in a bore 23 formed by a depending sleeve or valve guide structure 25, which sleeve or guide may be an integral part of the end wall 16.

The valve member 22 is disposed in the depending sleeve 25 in a manner to form an inner chamber 26 within the main valve chamber 17. The chamber 26 is defined by the sleeve 25, the end wall 16 and the end portion of the cup-shaped valve member 22.

The valve member 24 is disposed concentrically with the valve member 22 to form a second inner chamber 27 within the main valve chamber 17 and below that of the first inner chamber 26.

Fluid communication between the inner chambers 26 and 27 may be provided by openings 22a provided in the end portion of the cup-shaped valve member 22 as shown, or by other suitable means. The chambers 26 and 27 will vary in volume in dependence upon the position of the movable valve members 22 and 24 in a manner to be explained hereinafter.

The first valve member 22 is suitably attached to an actuating stem or shaft 28 slidably received in a sealing member 29 fixed in the end wall 16, so that during use of the valve 10 fluid leakage to atmosphere is minimized between the valve shaft 28 and the end wall 16.

The shaft 28 is a hollow structure designed to accommodate a second, rod shaped shaft 30, the lower portion of which extends through and is suitably attached to a pilot valve member 32 centrally disposed in the second valve member 24 and in axial alignment with a minor, pressure balancing port 34 provided in the lower portion of the member 24.

The lower portion of the shaft 30 extends freely through a retaining plate or disc 36 suitably attached to the second valve member 24 above the pilot valve member 32 and captivating the same. The plate 36 may be provided with ports 37 as shown.

Figure 2:
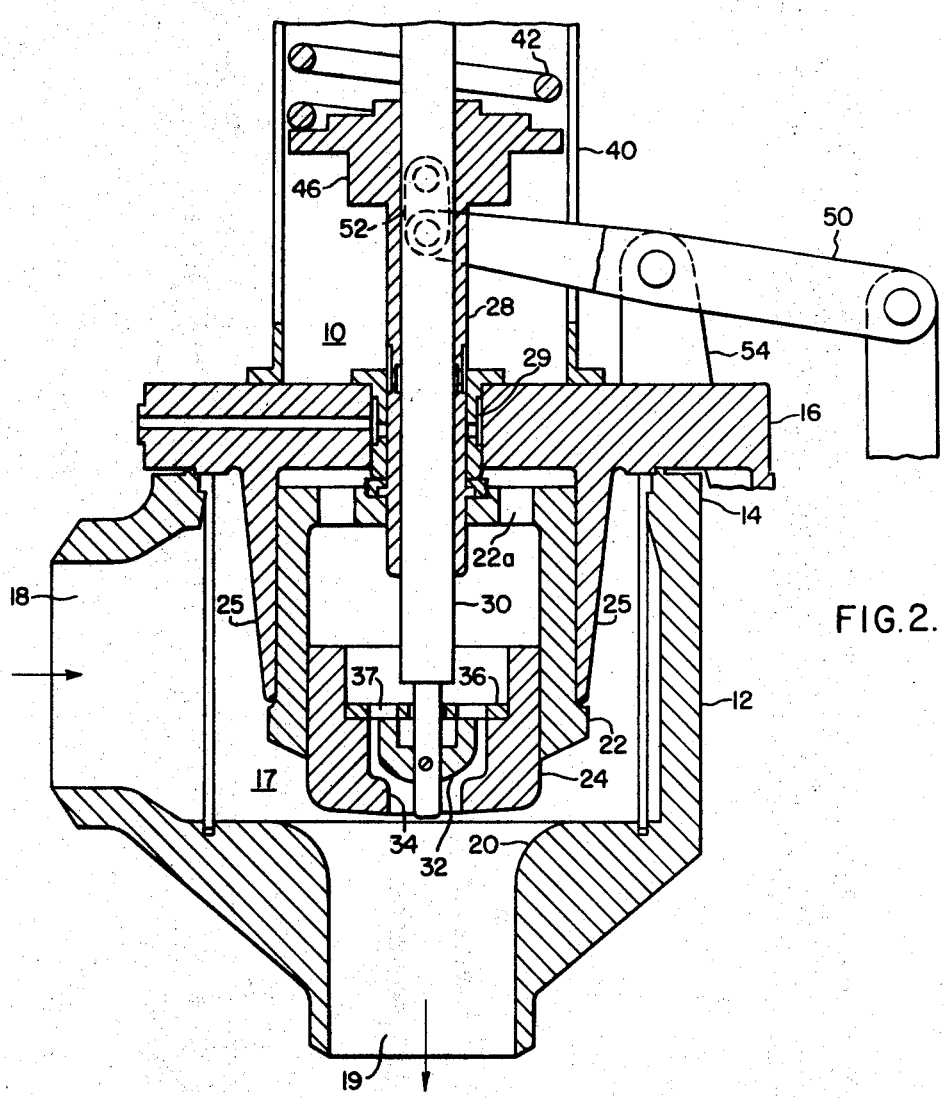
FIG. 2 is a view similar to FIG. 1 but with the stop valve structure in a fully open position and the control valve structure in a partially open position.

The valve members 22 and 24 may be operatively controlled or positioned in any suitable manner. However, as illustrated, the valve 10 is disposed on a vertical axis and is of the type biased in a closed, abutting position against the valve seat 20, but held in open and fluid controlling positions during normal operation by a force exerted against said bias. Thus, the valve members are disposed in fluid blocking and abutting relation with the valve seat 20 in FIG. 1 and are moved in upwardly axial direction to unblock the latter as shown in FIG. 2.

To maintain the valve members 22 and 24 in blocking relation with the valve seat 20, there is provided a shell structure 40 having its lower end rigidly attached to the end wall 16 in a suitable manner and supporting portions of the actuating shafts 28 and 30 in cooperation with helical biasing springs 42 and 44 in a manner presently to be explained.

As shown in FIG. 1, the shafts 28 and 30 extend into the shell 40 and are provided with respective abutment structures 46 and 48 rigidly attached thereto. The abutment structures form seats for the lower portion of the springs 42 and 44, the springs being disposed in compression within the shell 40. Accordingly, as thus far described, the valve structure 10 is effective to maintain the movable valve members 22 and 24 in blocking relation or position with the valve seat 20, and the force which maintain this position is provided by the compressed springs 42 and 44.

Figure 3:
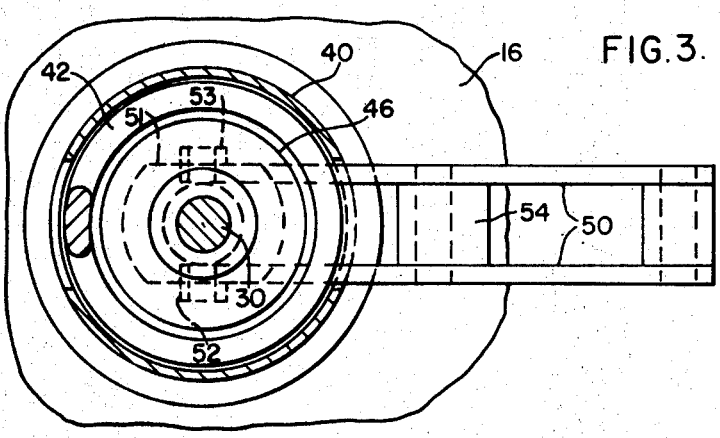
FIG. 3 is a view of the stop valve actuating structure shown in FIGS. 1 and 2 taken along lines III—III of FIG. 1.

As seen in the view of FIG. 3, the abutment structure 46 is further attached to a lever arm 50 through oppositely disposed links 52 and 53 pivotally attached to a lower shoulder portion 51 of the structure 46. The lever arm extends through the shell 40 and is pivotally mounted on a fulcrum member 54 rigidly fixed to the end wall 16 of the valve chamber 17.

The stop valve member 22 is movable to an open or unblocking position by application of a downwardly directed force on the end of the lever arm 50 remote from the links 52 and 53. This force may be applied manually or by any suitable actuating mechanism such as a servomotor or fluid cylinder (not shown) actuated in response to an "open" signal.

When the opening force is applied to the lever arm 50, the abutment structure 46, pivotally attached thereto through the links 52 and 53, moves the shaft 28 is upward direction against the closing force of the springs 42. The stop valve 22 is moved towards the top of the valve chamber 17 in the bore 23 independently of the control valve member 24 by the shaft 28 to open the inlet port 18. Fluid flow through the valve, however, remains blocked as long as the control valve member 24 remains seated against the valve seat 20. Thus both valve members must be moved away from the valve seat before fluid is permitted to flow through the valve 10, as indicated by appropriate arrows in FIG. 2.

As shown in FIG. 1, the upper portion of the control valve shaft 30 extends through an opening 55 in the upper end of the shell 40, and, as explained above, the portion of the shaft within the shell 40 and the valve chamber 17 extends, in slidable relation, through the stop valve shaft 28 to the pilot valve member 32.

The control valve 24 may be opened and controlled by a force applied axially to the upper end of the shaft 30 against the force of the helical spring 44 seated against the abutment structure 48 fixed to the shaft. Like that required for moving the stop valve 24, this force may be applied manually or by a suitable mechanism (not shown) actuated in response to a signal. The signal in this case, however, is a control signal effective to precisely position the valve member 24 in the valve chamber 17 in order to closely regulate the amount of fluid flow through the valve chamber when the stop valve 22 is in an open position as shown in FIG. 2.

In operation, pressurized fluid is directed through the inlet port 18 into the valve chamber 17 as indicated by the arrow in FIG. 1. With both valve members 22 and 24 in closed position, as shown in FIG. 1, fluid pressure accumulates in the inner chambers 26 and 27 by virtue of unavoidable fluid leakage along the bore surface 23 and the bore engaging surface of the stop valve member 22. Thus, the fluid pressure is essentially the same in chambers 26, 27 and 18, and no pressure differential exists across the valve member 22. No fluid flows through the valve 10, however, so that no fluid pressure exists in the outlet port 19 with both valve members disposed in a closed position. Thus, a pressure differential develops across the valve 10 with pressurized fluid directed through the inlet port 18; if the valve is a large size valve, such as would be employed in steam turbine apparatus, the pressure differential thereacross is large.

With the leakage of fluid pressure into the inner chambers 26 and 27, this large pressure differential develops across the control valve member 24, the openings 22a in the end portion of the valve member 22 admitting the fluid into the chamber 27 from the chamber 26. Thus, the force of the large pressure differential exists across the control valve member 24, thereby making it difficult to open said member unless the pressure thereacross is substantially equalized.

For this reason the control valve member 24 may be provided with the pilot valve member 32 and the minor port 34, though the invention is not limited thereto. When the force for opening the control valve member 24 is applied to the shaft 30, the pilot valve opens first since the control valve member 24 is not directly attached to the shaft 30. This relieves the pressure within the chamber 27 by allowing it to bleed through the ports 37 in the retaining plate 36 and the minor port 34 into the outlet port 19, thereby equalizing the pressure across the control valve member 24 before opening force is applied to the control valve member. Before the opening force is applied to the control valve member, the pressure thereacross is thus relieved, thereby permitting a lesser force to open the valve member 24.

When the pilot valve member 32 is moved upwardly by the opening force applied to the shaft 30, the pilot valve member engages the retaining plate 36, fixed within the control valve member 24, and lifts the control valve member from the valve seat 20, as shown in FIG. 2; this is done independently of the stop valve member 22. When the controlling force is completely removed from the shaft 30, the force of the helical spring 44 returns the control valve member to its closed position against the valve seat, and forces the pilot valve member into the port 36 in the control valve member as shown in FIG. 1.

When the control valve member 24 is in a closed position as shown in FIG. 1, it serves to block the flow of fluid through the combined valve 10 (like that of the stop valve 22) when or if the stop should remain open. Thus, the control valve member can assure interruption of a fluid flow if the stop valve member or its control becomes inoperative. This is particularly important in steam turbine applications where it is desirable to doubly insure shut-down or deenergization of the turbine units when abnormal or dangerous conditions arise.

As can be appreciated by those knowledgeable in the valve art, the combined valve structure 10 of the present invention provides a savings in cost and installation space heretofore unavailable with separate stop and control valve structures. The savings in cost and space is approximately half of that of currently employed separate stop and control valve structures. This is accomplished without a sacrifice in valve performance and without a sacrifice in the volumetric capacity of the valve to handle the flow of pressurized fluid therethrough.

Although only one embodiment of the invention has been shown it will be obvious to those skilled in the art that the invention is not so limited, but is susceptible to various other changes without departing from the spirit thereof.

I claim as my invention:

1. A valve structure for controlling the flow of pressurized fluid, the structure comprising
   a housing forming a main valve chamber having a central axis, said housing having an inlet and an outlet port communicating with said chamber,
   a fixed valve seat associated with at least one of said ports and in alignment with said axis,
   a first valve member slidably disposed within said housing for movement along said axis, said valve member being movable into abutment with said fixed valve seat to a first position to block the flow of fluid therethrough, and movable out of abutment with said valve seat along said axis to a second position to permit a full flow of fluid therethrough,
   a second valve member disposed concentrically in said first valve member and movable into abutment with said fixed valve seat to one position to block the flow of fluid therethrough,
   said second valve member being further disposed for movement relative to and independent of said first valve member and out of abutment with said valve seat along said axis to regulate the flow of fluid through said valve structure when said first valve member is in an open position,
   said first valve member having an inverted cup-shape and being disposed in the main valve chamber to form a first inner chamber therein,
   said second valve member having a cup-shaped and being inverted relative to said first valve member,
   said first and second valve members jointly forming a second inner chamber,
   first means for moving said first valve member from said first to said second position, and
   second means for moving said second valve member independently of said first moving means.

2. The structure recited in claim 1 in which the valve seat is formed in the outlet port.

3. The structure recited in claim 1 in which the inlet and outlet ports are disposed at substantially right angles to each other.

4. The structure recited in claim 1 in which the second valve member is provided with a minor, pressure balancing port and a pilot valve member disposed in movable cooperation with said minor port, said pilot valve member being movable to an open position by initial movement of the second moving means,
   the second valve member being movable by a following action of the pilot valve.

5. The structure recited in claim 1 in which means are provided on said first valve member to allow fluid communication between said first and second inner chambers.

6. A valve structure for controlling the flow of pressurized fluid, the structure comprising:
   a housing forming a main valve chamber having a central axis, said housing having an inlet and an outlet port communicating with said chamber,
   a fixed valve seat associated with at least one of said ports and in alignment with said axis,
   a first valve member slidably disposed within said housing for movement along said axis, said valve member being movable into abutment with said fixed valve seat to a first position to block the flow of fluid therethrough, and movable out of abutment with said valve seat along said axis to a second position to permit a full flow of fluid therethrough,
   a second valve member disposed concentrically in said first valve member and movable into abutment with said fixed valve seat to one position to block the flow of fluid therethrough,
   said second valve member being further disposed for movement relative to and independent of said first valve member and out of abutment with said valve seat along said axis to regulate the flow of fluid through said valve structure when said first valve member is in an open position,
   first means for moving said first valve member from said first to said second position,
   second means for moving said valve member independently of said first moving means,
   said valve housing including an end wall,
   said means for moving the first and second valve members including
   a hollow, tubular shaft attached to said first valve member and extending through said end wall,
   an inner shaft slidably disposed within said tubular shaft and attached to said second valve member,
   said tubular shaft having an actuating structure comprising
   a spring for biasing said first valve member towards the first position,
   an abutment structure rigidly attached to said shaft and supporting said spring, and
   a lever arm having one end pivotally attached to said abutment structure, and an intermediate portion pivotally mounted on said end wall, said arm being effective to move said first valve member to said second position when an opening force is applied to the other end of said arm.

References Cited

UNITED STATES PATENTS

| | | | |
|---|---|---|---|
| 321,913 | 7/1885 | Prusmann | 137—637.4 |
| 987,801 | 3/1911 | Greuter | 137—637.2 X |
| 1,867,195 | 7/1932 | Teller | 137—630.14 |
| 2,561,214 | 7/1951 | Matson | 137—630.13 |
| 2,633,857 | 4/1953 | MacDonald | 137—637 X |
| 3,055,350 | 9/1962 | Buchi | 137—637.2 X |
| 3,428,090 | 2/1969 | Hose | 137—630.14 |

CLARENCE R. GORDON, Primary Examiner

U.S. Cl. X.R.

137—630.14, 637.2